United States Patent [19]

Benson

[11] Patent Number: 4,703,999

[45] Date of Patent: Nov. 3, 1987

[54] WIDE-ANGLE-REFLECTIVE CUBE-CORNER RETROREFLECTIVE SHEETING

[75] Inventor: Gerald M. Benson, St. Paul, Minn.

[73] Assignee: Minnesota Mining and Manufacturing Company, St. Paul, Minn.

[21] Appl. No.: 874,537

[22] Filed: Jun. 16, 1986

[51] Int. Cl.[4] .......... G02B 5/12

[52] U.S. Cl. .......... 350/103

[58] Field of Search .......... 350/102, 103

[56] References Cited

U.S. PATENT DOCUMENTS

| | | | |
|---|---|---|---|
| T987,003 | 10/1979 | Johnson et al. | 356/445 |
| 3,140,340 | 3/1961 | Weber | 88/82 |
| 3,450,459 | 10/1965 | Haggerty . | |
| 3,541,606 | 11/1970 | Heenan et al. | 350/103 |
| 3,700,305 | 10/1972 | Bingham | 350/105 |
| 3,712,706 | 1/1973 | Stamm | 350/103 |
| 3,712,713 | 1/1973 | Appeldorn | 350/276 |
| 3,811,647 | 5/1974 | Pink | 350/103 |
| 3,923,379 | 12/1975 | Kumada | 350/150 |
| 3,924,929 | 12/1975 | Holmen et al. | 350/103 |
| 3,926,420 | 12/1975 | Raymond | 269/47 |
| 4,025,159 | 5/1977 | McGrath | 350/105 |
| 4,066,331 | 1/1978 | Lindner | 350/103 |
| 4,303,305 | 12/1981 | Jones | 350/103 |
| 4,349,598 | 9/1982 | White | 428/161 |
| 4,555,161 | 11/1985 | Rowland | 350/103 |

FOREIGN PATENT DOCUMENTS

| | | |
|---|---|---|
| 1590116 | 5/1981 | United Kingdom . |
| 2027441 | 5/1983 | United Kingdom . |

*Primary Examiner*—Bruce Y. Arnold
*Assistant Examiner*—Loha Ben
*Attorney, Agent, or Firm*—Donald M. Sell; James A. Smith; Roger R. Tamte

[57] ABSTRACT

Cube-corner retroreflectors having a rear surface configured with a cube-corner reflective element are made capable of reflecting light over a wide range of incident angles by placing a specularly reflective surface shaped as a negative of the cube-corner reflective element in closely spaced mating relationship with said rear surface.

6 Claims, 8 Drawing Figures

27 23 24 22 28 23 24 22 29

WIDE-ANGLE-REFLECTIVE CUBE-CORNER RETROREFLECTIVE SHEETING

Cube-corner retroreflective sheeting provides the brightest reflectivity of any known retroreflective sheeting, and yet it has found only limited uses. One reason for this limited use is that cube-corner retroreflective sheeting reflects within only a narrow range of incidence or entrance angles (the angle between the path of incident light and a line normal to the sheeting). For example, the "half-brightness" angle (i.e., the incidence angle at which the reflection is half as bright as the reflection of perpendicular, or zero-incidence-angle, light) for "conventional" acrylic-based cube-corner retroreflective sheeting (i.e., sheeting as illustrated in FIG. 1 of U.S. Pat. No. 3,712,706, which uses cube-corner retroreflective elements having equal-sized faces and an optical axis perpendicular to the front face of the sheeting) is about 21°, which compares with the half-brightness angle of about 45° or more for glass-microsphere-based retroreflective sheetings. Also, the retroreflection from a cube-corner retroreflective sheeting is dependent on the rotational angle at which light is incident on the sheeting, so that from certain rotational angles a viewer receives a limited reflection.

Various proposals have been made to overcome the limited angularity of cube-corner retroreflectors. In some versions of molded cube-corner retroreflectors such as used for reflectors on automobiles, a portion of the individual cube-corner elements of the reflector are tilted, so that the tilted elements will reflect light that strikes the reflector at a higher incidence angle (see U.S. Pat. Nos. 3,541,606; 3,923,379; 3,926,420 and 4,066,331). However, tilting of the cube-corner reflective elements in this manner requires a loss in other properties, such as a reduction in "head-on" reflection, i.e., reflection of zero-incidence-angle light, which strikes the reflector on a path that is perpendicular to the reflector. Also, the listed patents are directed to reflectors with large cube-corner retroreflective elements, made by molding procedures that are not adapted to formation of very small cube-corner retroreflective elements such as used in reflective sheeting for traffic signs.

In the sheeting field, novel cube-corner retroreflective elements have been developed (see U.S. Pat. No. 4,349,598) which retroreflect light that strikes them at a large incidence angle, but sheeting made with such elements does not reflect low-incidence-angle light well; the narrow range of angularity is simply shifted to a different segment of incoming light.

U.S. Pat. No. 3,450,459 also seeks to provide reflection of high-incidence-angle light, but it uses a multifaceted retroreflective element that is not adapted to manufacture in sheeting form and that further is not demonstrated to provide any real improvement in angularity.

U.S. Pat. Nos. 3,140,340 and 4,303,305 teach articles in which a second retroreflector (a glass-microsphere reflector in the '340 patent and a cube-corner reflector in the '305 patent) is positioned behind a transparent cube-corner retroreflective retroreflector, and the assembly is found to have increased angularity. However, such an assembly is thick (the first cube-corner retroreflector must use substantially larger-sized cube-corner retroreflective elements), which leaves it with limited utility.

A different approach to improved angularity is to coat the rear of reflecting surface of cube-corner elements with a specularly reflective material such as aluminum. However, while such a coating achieves an increase in angularity, it also absorbs light, and the overall effect is a significant reduction in "head-on" reflection. Also, the coating has other disadvantages (e.g., it gives the retroreflective sheeting a gray color in contrast to the desired white or other colors).

SUMMARY OF THE INVENTION

The present invention provides a new cube-corner retroreflective product which provides half-brightness angles in a cube-corner retroreflector approaching those achieved in glass-microsphere retroreflective sheeting, while still maintaining and even enhancing other desired properties of cube-corner retroreflectors. In brief summary, a cube-corner retroreflector of the invention comprises a transparent layer configured on its rear surface with cube-corner retroreflective elements which retroreflect light beamed against the front of the layer, and a specularly reflective layer having a specularly reflective surface which is a negative of the configured rear surface of the transparent layer and which is interfitted with and closely spaced from said rear surface, with the adjacent and matching portions of the specularly reflective and rear surfaces being substantially parallel to one another.

In contrast to previous specularly coated cube-corner retroreflectors, there is no reduction in retroreflection by retroreflectors of the present invention for light within the range of angles where conventional uncoated cube-corner retroreflectors reflect efficiently. Such a reduction is avoided because the specularly reflective layer is spaced from the cube-corner elements. Much of the light reflected by the cube-corner reflective element in a reflector of the invention never reaches the specularly reflective layer and therefore is not absorbed by that layer. Only light which passes through the surfaces of the cube-corner retroreflective element, and therefore would ordinarily not be reflected, strikes the specularly reflective layer, and only a portion of this light, which was previously totally lost, is absorbed by the specularly reflective layer. Also, the color of the reflector is substantially unaffected by the specularly reflective layer, so that bright white or other colored retroreflectors can be obtained.

The results achieved by the invention are remarkable. For example, we have made cube-corner retroreflective sheeting having a reflective brightness of 1718 candela per lux per square meter at a −4° incidence angle, with an observation angle of 0.2°, and a rotational angle of 0° (measurements made at a rotation angle of 0° are defined as measurements in a plane parallel to a groove or valley in the configured rear surface of the transparent body of a retroreflector of the invention, as will be described more fully in the following discussion), and brightnesses of 1016 and 425 candela per lux per square meter at incidence angles of 30° and 45°, respectively. By contrast, a conventional sheeting (having a transparent layer or body of the same configuration and composition of the transparent body of the tested sheeting of the invention, but without a specularly reflective layer of the invention) exhibited a reflective brightness of only 485 and 168 candela per lux per square meter at incidence angles of 30° and 45°. Also, as another comparison, a version of the conventional sheeting directly vapor-coated on its rear surface with aluminum exhibited a reflective brightness of 716 candela per lux per square meter at a −4° incidence or entrance angle, observation angle of 0.2° and rotational angle of 0°, and of 445 and 197 candela per lux per square meter at incidence angles of 30° and 45°. As will be seen, sheeting of the invention was brighter than the coated sheeting, not only at 0° but also at the larger incidence angles.

A different advantage of sheeting of the invention is an increase in rotational uniformity, i.e., an increase in the uniformity of reflective brightness of the sheeting at high incidence or entrance angles as the rotational orientation of the sheeting is changed. With conventional cube-corner retroreflective sheeting, the reflective brightness of the sheeting will vary significantly as the sheeting is rotated through an angle of 0° to 90° around an axis perpendicular to the sheeting. Sheeting of the present invention exhibits a much smaller variation in reflective brightness for high-incidence-angle light during such rotation, mainly because light is not lost by transmission. The result is that it is less significant that sheeting of the invention be attached to a sign board in a particular orientation.

DETAILED DESCRIPTION

Figure 1:
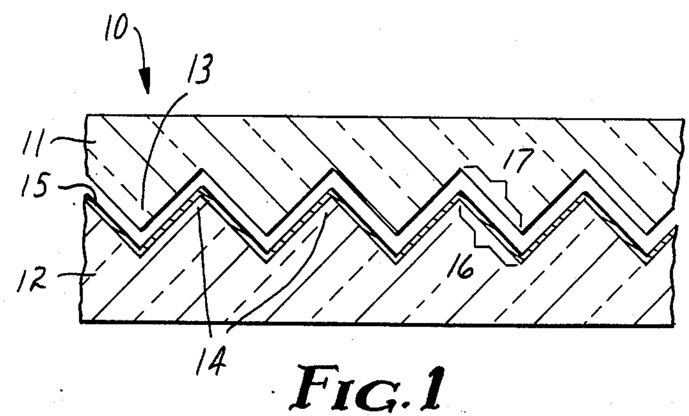
FIG. 1 is a sectional view through a portion of an illustrative retroreflective sheet material of the invention.

The illustrative sheet material of the invention 10 shown in FIG. 1 comprises a transparent sheet, body or layer 11 and a reflector sheet or layer 12 closely spaced from the transparent sheet. The transparent sheet 11 is configured on its rear or bottom surface with cube-corner retroreflective elements 13, and the reflector sheet 12 is configured on its front or top surface with projections 14 that mate with the cube-corner retroreflective elements 13 on the transparent sheet. In other words, the top or front surface of the underlying reflector sheet is a negative of the rear or bottom surface of the transparent sheet, with the pyramidal-shaped projections 14 on the reflector sheet fitting into valleys between the pyramidal-shaped cube-corner retroreflective elements, and vice versa. The top configured surface of the reflector sheet 12 carries a coating 15 of specularly reflective material, thus providing a specularly reflective surface that mates with and is closely spaced from the rear or bottom surface of the cube-corner retroreflective elements, with the adjacent and matching portions (e.g., 16 and 17 in FIG. 1) of the specularly reflective and rear surfaces being substantially parallel to one another.

The transparent sheet 11 is typically made by casting or embossing procedures using a configured embossing or casting surface typically generated as an electroform from a machined surface. For example, as taught in U.S. Pat No. 3,712,706, a metal plate may be grooved on a ruling machine using a V-shaped diamond tool held at appropriate angles. A first groove is cut, then the tool is offset a precise microscopic amount to achieve proper spacing, a second groove cut, and so on across the surface of the plate. Next, the plate is rotated 60° and a second set of grooves is cut to form a second surface of the cube-corner retroreflective elements. Finally, the plate is again rotated 60° and a third set of grooves is cut forming the third surface of the cube-corner retroreflective elements. The metal plate is typically used to generate negative and positive electroforms, and casting or embossing surfaces are then formed from the electroforms.

The transparent sheet may be formed as a monolithic sheet or as a composite sheet, for example, with a base flat-surfaced sheet which carries retroreflective elements cast onto the flat-surfaced sheet. The cast cube-corner retroreflective elements may or may not have the same index of refraction as the flat-surfaced sheet, and may or may not be made from the same material as the flat-surfaced sheet.

Figure 2:
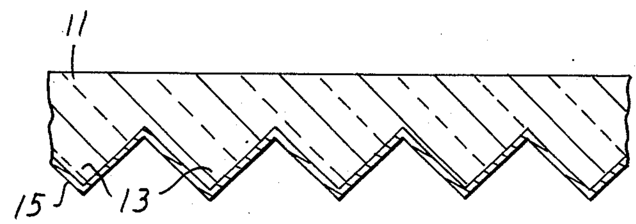
FIG. 2 is a sectional view through a portion of an intermediate product formed in the course of making retroreflective sheet material of the invention.
Figure 3:
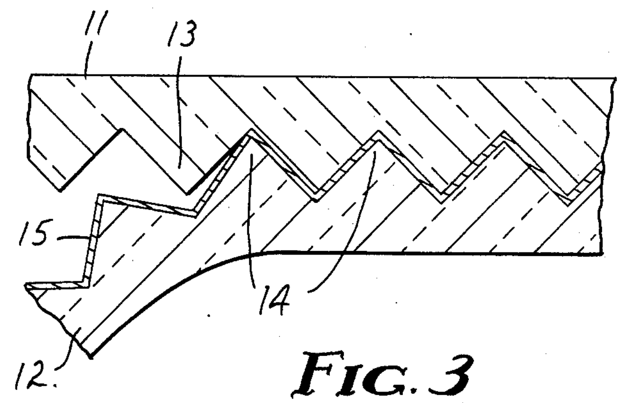
FIG. 3 is a sectional view through a portion of a sheet assembly which may be made in the course of making sheet material of the invention.

FIGS. 2 and 3 illustrate one possible method for manufacture of the reflector sheet 12 included in the sheet material of the invention shown in FIG. 1. In this method, the transparent sheet 11 is coated as shown in FIG. 2 with a specularly reflective layer 15, as by vapor-depositing or chemically depositing a metal such as aluminum, silver, or nickel, or by vapor-depositing a dielectric reflective layer (see U.S. Pat. No. 3,700,305). Next, the material for a backing for the reflector sheet 12 is coated or extruded onto the specularly reflective layer 15 and solidified as by cooling or crosslinking. After solidification, the backing material may be stripped away from the transparent sheet, as shown in FIG. 3. The backing material and process conditions are chosen so that the backing material has a greater affinity to the specularly reflective layer 15 than to the transparent sheet 11. Accordingly, the specularly reflective layer 15 transfers with the backing and separates from the transparent sheet.

As an alternative method, a reflector sheet can also be formed by casting or embossing techniques similar to those used to form the transparent sheet 11. For example, a casting or embossing surface may be generated from the machined plate described above but instead of using a negative of that machined surface such as may be used as a casting or embossing surface for the transparent sheet, a positive of the machined surface may be generated by a two-step electroforming process. A backing for the reflector sheet is cast or embossed and coated with a specularly reflective material.

The reflector sheet should be slightly spaced from the rear or bottom surface of the transparent sheet in order to achieve the advantages of the invention. If the two layers are in close contact with no air space, the sheeting becomes the same as one with a specularly reflective layer applied directly to the back surfaces. However, the spacing can be quite narrow or close, for example, as thin as about five wavelengths of light. Spacings greater than about one-fourth the height of the cube-corner retroreflective elements generally cause too great a reduction in the amount of retroreflection from the sheet material of the invention, because some light exiting the transparent sheet and reflected by the reflector sheet will not reenter the sheet at a point from which the sheet will return the light toward the source of the light. Preferably, the spacing is less than 5 percent of the cube-corner height.

Needed spacing can be obtained inherently when a reflector sheet is laid against the transparent sheet, because air trapped between the two sheets holds the sheets apart. The reflector sheet and transparent sheet can be adhered together in an assembled relation, e.g., by adhering together edge portions of the sheets in the manner described in U.S. Pat. No. 3,140,340, or by forming a network of bonds or bonding walls between the two sheets in the manner described in U.S. Pat Nos. 3,924,929 or 4,025,159. Spacing and adhesion can also be achieved by coating adhesive material onto the surface of one of the transparent or reflector sheets, e.g., in a network-like pattern, pressing the two sheets together, and solidifying the adhesive material. Still another alternative is use of exterior means such as clamps or insertion within an envelope formed by transparent sheets adhered at their edges.

Figure 4:
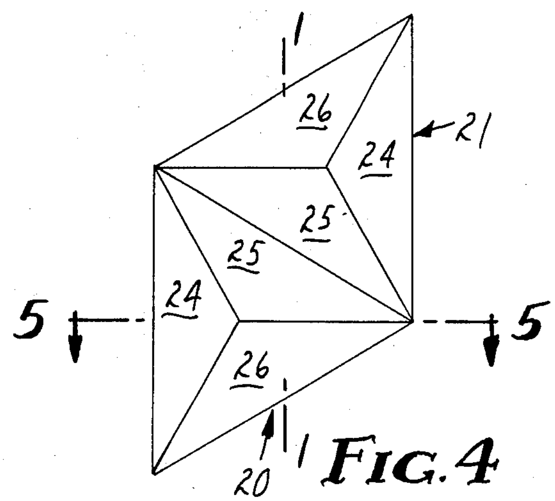
FIG. 4 is a bottom view of a portion (i.e., the transparent body portion) of the sheet material of the invention shown in FIG. 1.

The effect achieved by the invention can be further illustrated by reference to FIGS. 4–6 of the attached drawings. FIG. 4 shows, in greatly enlarged view, from the bottom, a part of a typical or representative transparent layer from a retroreflector of the invention, normally two adjacent cube-corner retroreflective elements 20 and 21 from the layer.

Figure 5:
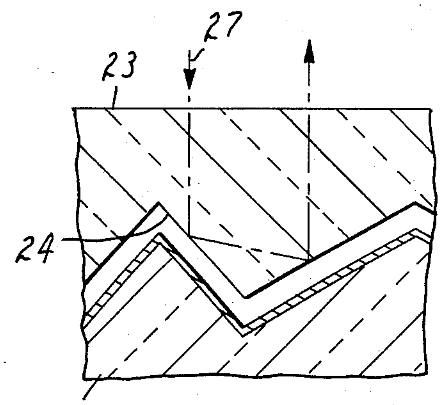
FIGS. 5 and 6 are enlarged sectional views through a sheet material of the invention along the plane 5—5 marked in FIG. 4.
Figure 6:
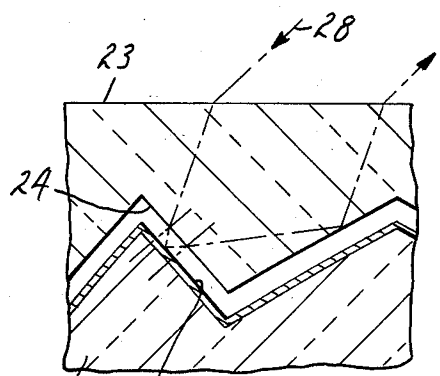

FIGS. 5 and 6 show a cross section through the representative retroreflective element taken along the line 5—5 in FIG. 4. In FIGS. 5 and 6, the portion of the reflector sheet 22 that mates with the cube-corner retroreflective elements 20 and 21 shown in FIG. 4 is also included in the drawing. The cube-corner retroreflective elements 20 and 21 are transparent bodies having a front face 23 and three mutually perpendicular surfaces 24, 25 and 26 such as obtained at the corner of a cube. A light ray 27 entering the front face 23 of the transparent cube-corner retroreflective element 20 travels to a first surface 24 of the element where, if the angle at which the light ray strikes the surface is more than the critical angle, the light is reflected by internal reflection from the surface. (The critical angle depends upon the index of refraction for the material from which the element is made; a representative index of refraction for an acrylic polymeric material is about 1.5, and the critical angle for such a material is about 42°.) The light reflected from the surface 24 thereupon travels to a second surface of the cube-corner retroreflective element, where it is again reflected if the critical angle is exceeded, this time to the third surface. At the third surface it can be again reflected, and this third reflection directs the light back along a path substantially parallel to the path that the light traveled to the reflector (in the two dimensional representation of FIG. 5, which is commonly used, the ray 27 is shown being returned toward the source of the light after being reflected from only two surfaces, because of the difficulty of representing reflection from a third surface).

The narrow angularity of cube-corner retroreflective elements or sheeting arises because highly inclined light, e.g., the light ray 28 in FIG. 6 having a large incidence angle to the front surface 23 of the element 20, will strike the first surface 24 of the element 20 at an angle that is less than the critical angle for that surface. Because it strikes the surface at an angle that is less than the critical angle, the light ray 28 passes through the surface 24, and in conventional cube-corner retroreflective sheeting that light is lost and not retroreflected.

However, in reflectors of the invention, much of the light that passes through the surfaces of the cube-corner retroreflective element strikes an underlying spaced specularly reflective layer, whose surface is substantially parallel to the surface through which the light passed, i.e., the surface 29 in FIG. 6, and is reflected back into the cube-corner retroreflective element. After re-entry into the cube-corner retroreflective element, the light can be reflected by a second surface, or an underlying spaced specularly reflective layer and then similarly by a third surface or underlying specularly reflective layer back along a path substantially parallel to the the path that the light originally traveled to the element.

Figure 7:
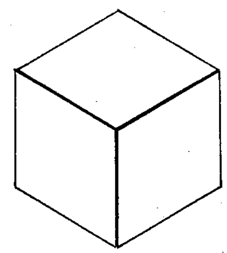
FIG. 7 is a bottom view of a different variety of cube-corner retroreflective element useful in the invention.

The elements 20 and 21 shown in FIG. 4 can be described as truncated cube-corner retroreflective elements, and contrast with a different useful retroreflective element shown in FIG. 7 which is commonly called a full cube-corner retroreflective element. The full cube-corner retroreflective element as shown in FIG. 7 has square side surfaces and because of that larger surface area can reflect larger proportions of light striking the element. However, because of their full shape, such cube-corner elements nest together in a way that does not permit manufacture of a cube-corner surface by grooving techniques and, therefore, makes manufacture of microsized cube-corner elements difficult. The truncated form shown in FIG. 4, on the other hand, can be readily made by the grooving techniques described above. Retroreflectors or sheets of the invention can use either the retroreflective element shown in FIGS. 4 or 7.

Incidentally, FIGS. 1–3 show product that is sectioned approximately along the line 1—1 in FIG. 4.

Sample materials for the transparent sheet or layer are acrylic polymers such as polymethylmethacrylate, polymethylmethacrylate and polyacrylate blends, polycarbonate, polyethylene terephthalate, and vinyl polymers, or reactive materials such as taught in United Kingdom Pat. No. 2,027,441.

The backing of the reflector sheet is preferably a reacted or crosslinked material so as to provide dimensional stability. Useful materials of that type are polyacrylates, urethane oligomers, silicone elastomers, and epoxy resins. Thermoplastic polymeric materials such as polyvinylacetate can also be used. In a different approach, the specularly reflective sheet is formed directly from metal, as by embossing a metal foil or a laminate of metal foil and polymeric material.

The adhesive materials for adhering the transparent and reflector sheets together are preferably reactive materials, usually reacted through radiation such as ultraviolet or electron-beam radiation or by application of heat.

Although the invention has been described in terms of sheeting, where it makes several contributions, the invention is also useful for larger cube-corner reflectors such as molded, perhaps more rigid, polymeric or glass plates. Such molded larger cube-corner retroreflectors of the invention exhibit improved wide angularity, bright retroreflectivity, good color, reduced orientation sensitivity, etc. The cube-corner retroreflective elements in molded or larger cube-corner retroreflectors are often of a shape as shown in FIG. 7. The microsized cube-corner retroreflective elements in thin sheeting typically have triangular surfaces, since the grooving operation forms such surfaces. Also, the cube-corner retroreflective elements used in reflectors of the invention can be tilted, e.g., as taught in U.S. Pat. Nos. 4,349,598, or 3,926,420. It is desirable to use a specularly reflective layer that overlaps substantially all of the mutually perpendicular surfaces of the cube-corner retroreflective elements.

The invention will be further illustrated by the following examples.

EXAMPLE 1

A transparent sheet like the sheet 11 shown in FIG. 1 was formed from an extrusion-grade polycarbonate polymer using a negative embossing tool generated from a machined metal plate as described above. The individual cube-corner retroreflective elements had a base width of 0.0125 inch and a height of 0.0059 inch. The configured rear surface of the prepared transparent sheet was vapor-coated with aluminum, after which the material for the backing of a reflector sheet was coated onto the aluminum. This material was comprised of an epoxy resin, i.e., a particle-filled diglycidyl ether of bisphenol A. After coating onto the aluminum layer, it was crosslinked by heating at 90° F., and stripped away from the transparent sheet. The aluminum layer transferred with the backing, forming a specularly reflective surface that was a negative of the configured rear surface of the transparent sheet. The reflector sheet was then reassembled in close spacing to the transparent sheet by light hand pressure, and the reflective properties of the assembly were measured. Using the rotation angle that achieved maximum head-on brightness, the reflectivity of the assembly was measured with a retroluminometer described in Defensive Publication T 987,003 and was found to have retroreflective brightness values as in the following table.

TABLE I

| Incidence Angle | Retroreflective Brightness Candlepower/Lumen/Square Foot |
|---|---|
| 4° | 1650 |
| 30° | 1365 |
| 40° | 880 |
| 45° | 576 |

The assembly was determined to have a half-brightness angle of about 41° at the rotation orientation of the test.

EXAMPLE 2

Example 1 was repeated with different samples as follows:

In Sample 2-A, the transparent sheet was a polyacrylate having a refractive index of 1.49 and the specularly reflective layer was chemically deposited silver. In Sample 2-B, the transparent sheet was a polycarbonate having a refractive index of 1.57, with a vapor-deposited aluminum specularly reflective layer.

Retroreflective brightness for each sample was measured for the following different forms of each sample:

(i) Cube-corner sheet with no specular layer present;

(ii) Cube-corner sheet with specular layer adhered to the sheet;

(iii) Dual layer construction of the invention with the specular layer spaced from the rear surface of the first cube-corner sheet.

Reflectively measurements were made at 0.2° observation angle and at the entrance angles and rotational angles indicated below with the following results.

TABLE II

| | 0° ROTATION | | | 90° ROTATION | | |
|---|---|---|---|---|---|---|
| Entrance angle | −4° | 30° | 45° | −4° | 30° | 45° |
| SAMPLE 2-A (Polyacrylate/silver) | | | | | | |
| (i) | 2018 | 145 | 24 | 2880 | 754 | 217 |
| (ii) | 1464 | 646 | 307 | 1045 | 808 | 296 |
| (iii) | 2038 | 848 | 394 | 2873 | 1005 | 341 |
| SAMPLE 2-B (Polycarbonate/aluminum) | | | | | | |
| (i) | 1333 | 497 | 29 | 1604 | 485 | 168 |
| (ii) | 570 | 294 | 138 | 716 | 445 | 197 |
| (iii) | 1420 | 678 | 180 | 1718 | 1016 | 425 |

EXAMPLE 3

Retroreflection was measured on the following samples:

Sample 3-A: A conventional sheet of large (0.095-inch cube-corner size) full acrylic cube-corner retroreflective elements such as used for a highway delineator.

Sample 3-B: Sheeting as described in Example 2-B but without a specularly reflective layer.

Sample 3-C: Sample 3-A with a Sample 3-B type behind it (as described in U.S. Pat. No. 4,303,305).

Sample 3-D: Sheeting of the invention using Sample 3-B with a silver specularly reflective layer spaced closely behind the rear surface of the Sample 3-B sheet.

Reflectivity measurements were made at a 0.2° observation angle and at the entrance angles indicated. Rotational angles were chosen to give maximum and minimum readings rather than taken at 0° and 90°.

TABLE III

| | Candlepower/ft candle/ft² at 0.2° observation angle | | | | | | |
|---|---|---|---|---|---|---|---|
| | −4° entrance | | | 45° entrance | | | 45° as % |
| | min. | max. | avg. | min. | max. | avg. | of −4° |
| Ex. 3-A | 457 | 907 | 682 | 3 | 51 | 27 | 4% |
| Ex. 3-B | 1116 | 1457 | 1287 | 19 | 250 | 135 | 11% |
| Ex. 3-C | 457 | 907 | 682 | 21 | 281 | 105 | 15% |
| Ex. 3-D | 943 | 1687 | 1315 | 240 | 540 | 390 | 30% |

Figure 8:
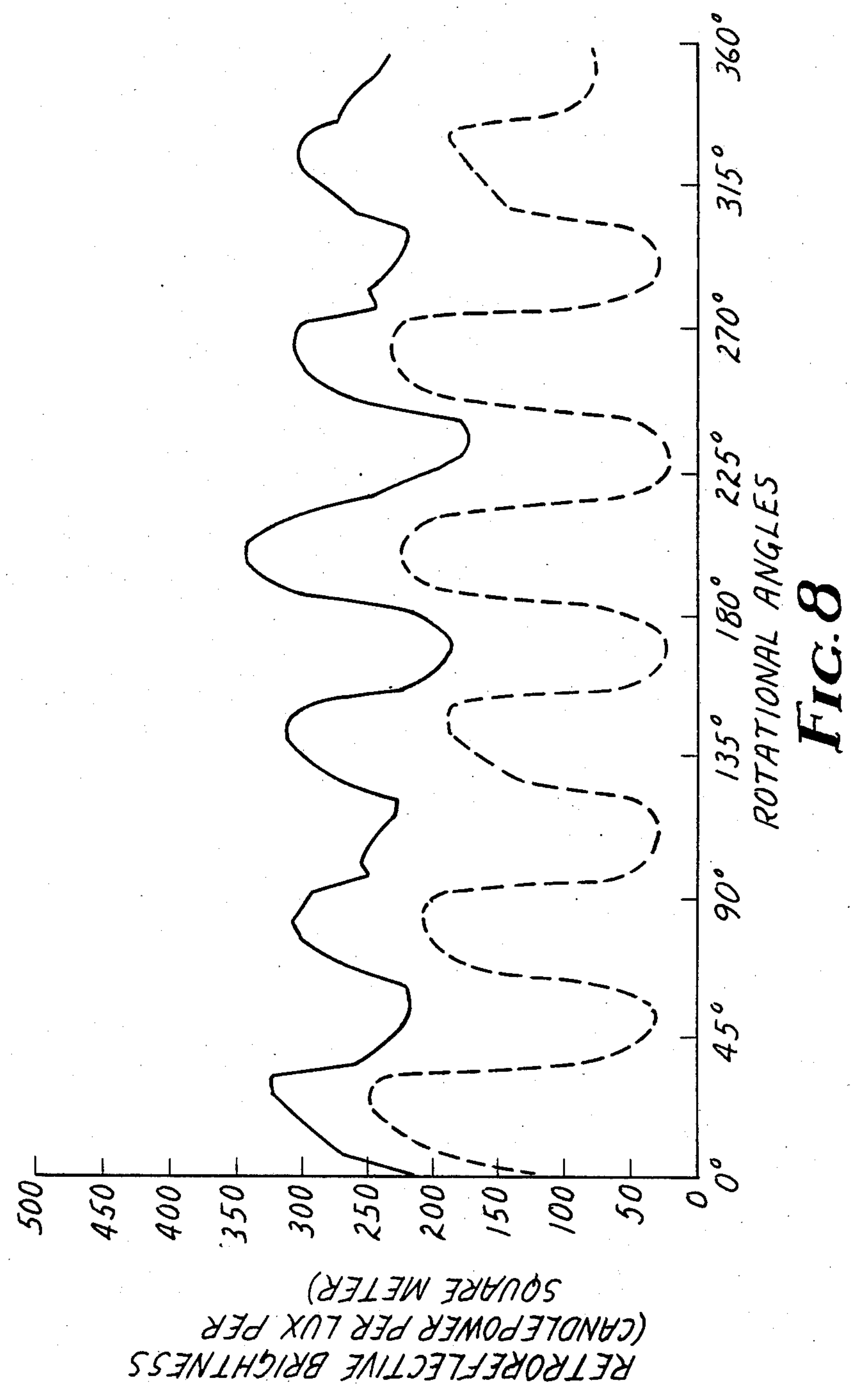
FIG. 8 is a plot of reflective brightness at different angles of rotation for a representative retroreflective sheeting of the invention in comparison to a similar sheeting without the specularly reflective layer included in the sheeting of the invention.

The data plotted in FIG. 8 illustrates the reduced rotational sensitivity for retroreflectors or sheet material of the invention for high-incidence-angle light. The dotted-line plot shows retroreflective brightness (plotted along the ordinate in candlepower per lux per square meter) for a polycarbonate cube-corner retroreflective sheet without specularly reflective layer (for example, like the Sample 3-B product in Example 3 above), and the solid-line plot is for a retroreflective sheet of the invention (like the Sample 3-D product in Example 3) having a silver specularly reflective layer spaced behind the polycarbonate transparent sheet. Retroreflective measurements were made at various rotational angles from 0° to 360°. The observation angle was 0.2°, and the entrance angle was 45°. As will be seen, at certain rotational angles the polycarbonate sheet without specularly reflective layer had very low reflective brightness. While the sheet of the invention, shown by the solid-line plot, also had variation in retroreflective brightness depending on rotational angle, the range between maximum and minimum retroreflective brightness was much less than for the conventional retroreflective sheet without specularly reflective layer; and the minimum values for the sheet of the invention approached the maximum values for the conventional cube-corner retroreflective sheet.

I claim:

1. Cube-corner retroreflector capable of reflecting light over a wide range of incidence angles comprising a transparent body configured on its rear surface with at least one set of three mutually perpendicular surfaces providing cube-corner retroreflection of light beamed against the front of the body, and a specularly reflective layer having a specularly reflective surface which is shaped as a negative of said set of three mutually perpendicular surfaces and which is interfitted with and closely spaced from said set of surfaces, with the adjacent and matching portions of the specularly reflective and rear surfaces being substantially parallel to one another.

2. Cube-corner retroreflector of claim 1 in which the transparent body is configured on its rear surface with a plurality of sets of three mutually perpendicular surfaces, and the specularly reflective layer is shaped as a negative of said sets of three mutually perpendicular surfaces.

3. Cube-corner retroreflective sheeting capable of reflecting light over a wide range of incidence angles comprising a transparent sheet configured on its rear surface with cube-corner retroreflective elements which retroreflect light beamed against the front of the sheet, and a reflector sheet having a specularly reflective surface which is a negative of the configured rear surface of the transparent sheet and which is interfitted with and closely spaced from said rear surface, with the adjacent and matching portions of the specularly reflective and rear surfaces being substantially parallel to one another.

4. Sheeting of claim 3 in which the specularly reflective surface is spaced from said rear surface on average by no more than about 25 percent of the height of the cube-corner retroreflective elements.

5. Sheeting of claim 3 in which said reflector sheet comprises a specularly reflective layer that was originally deposited on a surface configured with cube-corner retroreflective elements, and a backing applied to the deposited specularly reflective layer to which the specularly reflective layer preferentially adheres.

6. Flexible sheeting of claim 3 capable of being wound into a roll about a 2.5-centimeter-diameter mandrel.

* * * * *

UNITED STATES PATENT AND TRADEMARK OFFICE

CERTIFICATE OF CORRECTION

PATENT NO. : 4,703,999

DATED : November 3, 1987

INVENTOR(S) : Gerald M. Benson

It is certified that error appears in the above-identified patent and that said Letters Patent is hereby corrected as shown below:

In Table III, Ex. 3-C, column 8, line 44, the number "105" should read --151-- and the number "15%" should read --22%--.

Signed and Sealed this

Twenty-first Day of January, 1992

*Attest:*

HARRY F. MANBECK, JR.

*Attesting Officer*

*Commissioner of Patents and Trademarks*